US012811827B2

(12) United States Patent
Kim et al.

(10) Patent No.: US 12,811,827 B2
(45) Date of Patent: Nov. 24, 2026

(54) METHOD AND APPARATUS FOR DETECTING SIGNAL BASED ON ARTIFICIAL INTELLIGENCE MODEL IN WIRELESS COMMUNICATION SYSTEM

(71) Applicant: Samsung Electronics Co., Ltd., Suwon-si (KR)

(72) Inventors: Wonjun Kim, Suwon-si (KR); Suhwook Kim, Suwon-si (KR); Jeonghyeon Jang, Suwon-si (KR); Byeonghun Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 19/183,434

(22) Filed: Apr. 18, 2025

(65) Prior Publication Data

US 2026/0032019 A1 Jan. 29, 2026

(30) Foreign Application Priority Data

Apr. 26, 2024 (KR) ........................ 10-2024-0056319
Aug. 22, 2024 (KR) ........................ 10-2024-0112879

(51) Int. Cl.
*H04L 5/12* (2006.01)
*H04L 25/02* (2006.01)

(52) U.S. Cl.
CPC ........ *H04L 25/021* (2013.01); *H04L 25/0254* (2013.01)

(58) Field of Classification Search
CPC .......................... H04L 25/021; H04L 25/0254
USPC ................ 375/262, 260, 259, 219, 295, 316
See application file for complete search history.

(56) References Cited

U.S. PATENT DOCUMENTS 8,472,813 B2 6/2013 Cvijetic et al.
8,687,750 B1 4/2014 Lee et al.
2023/0082536 A1 3/2023 Hoydis et al.
2023/0198814 A1* 6/2023 Lee ...................... H04W 24/08 370/252
2023/0342590 A1 10/2023 O'Shea et al.

FOREIGN PATENT DOCUMENTS

CN 117692290 A 3/2024
WO 2021151477 A1 8/2021

OTHER PUBLICATIONS

Kim, et al., "AI-empowered MIMO Receiver For 5G-Ultra RAN," Samsung Best Paper Awards, 2 pages.

* cited by examiner

*Primary Examiner* — Zewdu A Kassa

(57) ABSTRACT

The present disclosure relates to a 5G communication system or a 6G communication system for supporting higher data rates beyond a 4G communication system such as long-term evolution (LTE). A method performed by a receiver in a wireless communication system according to embodiments of the disclosure may include: estimating a channel, based on a received signal; embedding the channel; performing spatial domain attention calculation for acquiring a cross-covariance value of a spatial domain, based on the embedded channel; performing resource element attention calculation for acquiring a cross-covariance value of a resource element domain, based on the embedded channel; and calculating a log likelihood ratio (LLR), based on results of the spatial domain attention calculation and the resource element attention calculation.

20 Claims, 12 Drawing Sheets

METHOD AND APPARATUS FOR DETECTING SIGNAL BASED ON ARTIFICIAL INTELLIGENCE MODEL IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2024-0056319 and 10-2024-0112879 filed on Apr. 26, 2024, and Aug. 22, 2024, in the Korean Intellectual Property Office, the disclosure of which is herein incorporated by reference in its entirety.

BACKGROUND

1. Field

The disclosure relates generally to a wireless communication system and, more specifically, to a method and an apparatus for performing signal detection based on an improved artificial intelligence (AI) model in a wireless communication system.

2. Description of Related Art

Considering the development of wireless communication from generation to generation, the technologies have been developed mainly for services targeting humans, such as voice calls, multimedia services, and data services. Following the commercialization of 5th generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, Radio Frequency (RF) elements, antennas, novel waveforms having a better coverage than Orthogonal Frequency Division Multiplexing (OFDM), beamforming and massive Multiple-input Multiple-Output (MIMO), Full Dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, Orbital Angular Momentum (OAM), and Reconfigurable Intelligent Surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, High-Altitude Platform Stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of Artificial Intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as Mobile Edge Computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In a wireless communication system, an artificial intelligence (AI) model may be used to detect a signal according to an estimated channel. To this end, a signal receiver may use an AI model for machine learning (ML) performance which has a lower level of complexity and has efficiency, that is, a transformer model including dual multi-head attention. Accordingly, a scheme for enabling the signal receiver to detect signals more accurately, based on the AI model, is under consideration.

The above information is presented as background information only to assist with an understanding of the disclosure. No determination has been made, and no assertion is made, as to whether any of the above might be applicable as prior art with regard to the disclosure.

SUMMARY

Various embodiments of the disclosure are to provide a device and a method capable of effectively providing services in a wireless communication system.

The technical subjects pursued in the disclosure may not be limited to the above-mentioned technical subjects, and other technical subjects which are not mentioned may be clearly understood from the following descriptions by those skilled in the art to which the disclosure pertains.

Various embodiments of the disclosure may provide an apparatus and a method capable of effectively providing a service in a wireless communication system.

A receiver in a wireless communication system according to embodiments of the disclosure may include: a channel estimation circuit configured to estimate a channel, based on a received signal; and a transformer-based neural unit coupled to the channel estimation circuit so as to detect an output signal. The transformer-based neural unit may include: a feature embedding block for embedding the channel; and at least one transformer block for calculating a log likelihood ratio (LLR), based on the embedded channel. The least one transformer block may include: a first multi-head attention (MHA) module regarding a spatial domain; and a second MHA module regarding a resource element (RE).

A method performed by a receiver in a wireless communication system according to embodiments of the disclosure may include: estimating a channel, based on a received signal; embedding the channel; performing spatial domain attention calculation for acquiring a cross-covariance value of a spatial domain, based on the embedded channel; performing resource element attention calculation for acquiring a cross-covariance value of a resource element domain, based on the embedded channel; and calculating a log likelihood ratio (LLR), based on results of the spatial domain attention calculation and the resource element attention calculation.

Various embodiments of the disclosure may provide an apparatus and a method capable of effectively providing a service in a wireless communication system.

Various embodiments of the disclosure provide a device and a method capable of effectively providing services in a wireless communication system.

Advantageous effects obtainable from the disclosure may not be limited to the above-mentioned effects, and other effects which are not mentioned may be clearly understood from the following descriptions by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
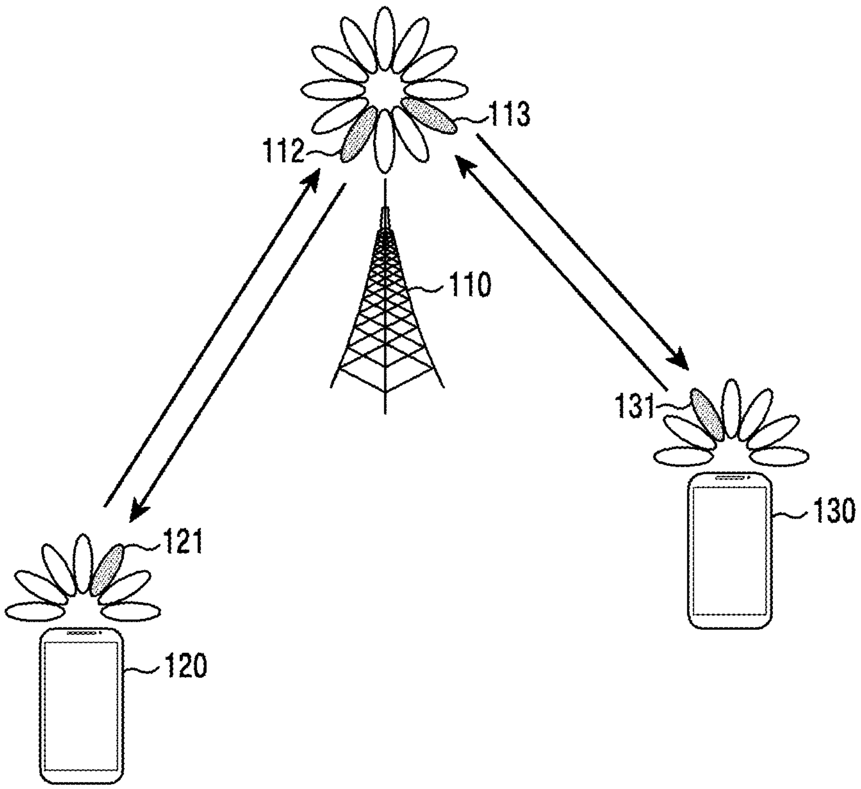
FIG. 1 illustrates an example of a wireless communication configuration according to embodiments of the disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are used merely to describe particular embodiments, and may not be intended to limit the scope of other embodiments. A singular expression may include a plural expression unless they are definitely different in a context. The terms used herein, including technical and scientific terms, may have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

In the following description, terms referring to device elements (e.g., controller, processor, artificial intelligence (AI) model, encoder, decoder, autoencoder (AE), and neural network (NN) model) and terms referring to data (e.g., signal, feedback, report, reporting, information, parameter, value, bit, and codeword) are illustratively used for the sake of descriptive convenience. Therefore, the disclosure is not limited by the terms as used below, and other terms having equivalent technical meanings may be used.

Furthermore, various embodiments of the disclosure will be described using terms used in some communication standards (e.g., the 3rd generation partnership project (3GPP)), but they are for illustrative purposes only. Various embodiments of the disclosure may be easily applied to other communication systems through modifications.

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

The term "module," "unit" or "-er/or" used in the disclosure denotes a software element or a hardware element such as a field-programmable gate array (FPGA) or an application-specific integrated circuit (ASIC), and performs a certain function. However, the term "module," "unit" or "-er/or" is not limited to software or hardware. The "module," "unit" or "-er/or" may be formed so as to be in an addressable storage medium, or may be formed so as to operate one or more processors. Thus, for example, the term "module," "unit" or "-er/or" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "module," "units" or "-ers/ors" may be associated with the smaller number of components and "module," "units" or "-ers/ors", or may be divided into additional components and "module," "units" "-ers/ors". Furthermore, the components and "module," "units" or "-ers/ors" may be embodied to reproduce one or more central processing units (CPUs) in a device or security multimedia card. Also, in an embodiment of the disclosure, the "module," "unit" or "-er/or" may include at least one processor.

FIG. 1 illustrates a wireless communication system according to various embodiments of the disclosure. FIG. 1 illustrates a base station 110, a UE 120, and another UE 130 as some nodes that use radio channels in the wireless communication system. Although only one base station is illustrated in FIG. 1, other base stations identical or similar to the base station 110 may be further included.

The base station 110 is a network infrastructure configured to provide the UEs 120 and 130 with radio accesses. The base station 110 has a coverage which is defined as a geographical area based on the signal transmission distance. The base station 110 may also be referred to as "access point (AP)," "eNodeB (eNB)," "gNodeB (gNB)," "5th generation node," "6th generation node," "wireless point," "transmission/reception point (TRP)," or other terms having equivalent technical meanings, in addition to "base station."

Respective UEs 120 and 130 are devices used by users to communicate with the base station 110 through radio channels. Depending on the case, at least one of the UEs 120 and 130 may be operated without user interventions. That is, at least one of the UEs 120 and 130 may be a device configured to perform machine type communication (MTC), and may not be carried by the user. Each of the UEs 120 and 130 may also be referred to as "terminal," "mobile station," "subscriber station," "customer premises equipment (CPE)," "remote terminal," "wireless terminal," "electronic device," "user device," or other terms having equivalent technical meanings, in addition to "user equipment (UE)."

The base station 110 or respective UEs 120 and 130 may transmit and receive radio signals in mmWave bands (for example, 28 GHz, 30 GHz, 38 GHz, 60 GHz, over 60 GHz, and the like). The base station 110 or respective UEs 120 and 130 may perform beamforming in order to improve the channel gain. The beamforming may include transmission beamforming and reception beamforming. That is, the base station 110 or respective UEs 120 and 130 may assign directivity to transmitted or received signals. To this end, the base station 110 or respective UEs 120 and 130 may select serving beams 112, 113, 121, and 131 through a beam search or beam management procedure. After the serving beams 112, 113, 121, and 131 are selected, communication may be performed through resources a quasi co-located (QCL) relationship with resources used to transmit the serving beams 112, 113, 121, and 131.

Figure 2:
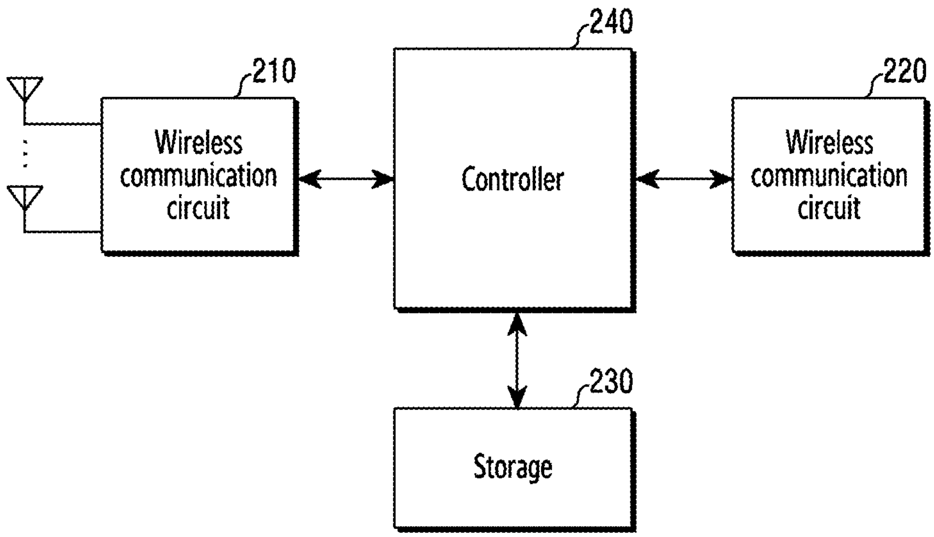
FIG. 2 illustrates an example of the configuration of a base station in a wireless communication system according to embodiments of the disclosure.

FIG. 2 illustrates an example of the configuration of a base station in a wireless communication system according to embodiments of the disclosure. According to various embodiments of the disclosure, the base station 110 may be referred to as a network for convenience of description. The configuration illustrated in FIG. 2 may be understood as the configuration of the base station 110. As used herein, terms such as " . . . unit," "-er," and the like may refer to units configured to process at least one function or operation, and the same may be implemented by hardware, software, or a combination of hardware and software.

Referring to FIG. 2, the base station 110 may include a wireless communication circuit 210, a backhaul communication circuit 220, a storage 230, and a controller 240.

The wireless communication circuit 210 performs functions for transmitting/receiving signals through radio channels. For example, the wireless communication circuit 210 performs functions for conversion between baseband signals and bitstrings according to the physical layer specifications of the system. For example, during data transmission, the wireless communication circuit 210 encodes and modulates a transmitted bitstring, thereby generating complex symbol. In addition, during data reception, the wireless communication circuit 210 restores a received bitstring by demodulating and decoding a baseband signal. In addition, the wireless communication circuit 210 up-converts a baseband signal into a radio frequency (RF) band signal, transmits the same through an antenna, and down-converts an RF band signal received through the antenna into a baseband signal.

To this end, the wireless communication circuit 210 may include a transmission filter, a reception filter, an amplifier, a mixer, an oscillator, a digital-to-analog converter (DAC), an analog-to-digital converter (ADC), and the like. In addition, the wireless communication circuit 210 may include multiple transmission/reception paths. Furthermore, the wireless communication circuit 210 may include at least one antenna array configured by multiple antenna elements. In hardware terms, the wireless communication circuit 210 may be configured by a digital unit and an analog unit, and the analog unit may be configured by multiple sub-units according to the operating power, operating frequency, and the like.

The wireless communication circuit 210 may transmit/receive signals. To this end, the wireless communication circuit 210 may include at least one transceiver. For example, the wireless communication circuit 210 may transmit synchronization signals, reference signals, system information, messages, control information, data, or the like. In addition, the wireless communication circuit 210 may perform beamforming.

The wireless communication circuit 210 transmits and receives signals as described. Accordingly, all or part of the wireless communication circuit 210 may be referred to as "transmitter," "receiver," or "transceiver." In addition, transmission and reception performed through a radio channel, as used in the following description, are intended to include the above-described processing performed by the wireless communication circuit 210.

According to various embodiments of the disclosure, the wireless communication circuit 210 may include a receiver which operates (that is, receives uplink signals) and is configured according to various embodiments described hereinafter. To this end, the receiver of the wireless communication circuit 210 may be disposed in the base station's digital unit (DU), or may be disposed together with one or more AI model entities for AI computing or a controller for controlling AI models. The receiver of the wireless communication circuit 210 may be controlled by a controller in order to perform operations according to various embodiments.

The backhaul communication circuit 220 provides an interface for communicating with other nodes in the network. That is, the backhaul communication circuit 220 converts bitstrings transmitted from the base station 110 to other nodes, for example, other access nodes, other base stations, upper-layer nodes, core networks, and the like into physical signals, and converts physical signals received from other nodes into bitstrings. The backhaul communication circuit 220 may obviously include a receiver having the same function as the receiver included in the wireless communication circuit 210 described above.

The storage 230 stores data such as basic programs for operations of the base station 110, application programs, and configuration information. The storage 230 may include a memory. The storage 230 may be configured by a volatile memory, a nonvolatile memory, or a combination of a volatile memory and a nonvolatile memory. The storage 230 provides the stored data at the request of the controller 240. According to an embodiment, the storage 230 may store learning data for AI-based signal detection, and may apply the stored learning data to a neural network structure for AI-based signal detection.

The controller 240 controls overall operations of the base station 110. For example, the controller 240 transmits and receives signals through the wireless communication circuit 210 or the backhaul communication circuit 220. In addition, the controller 240 records and reads data in the storage 230. The controller 240 may also perform functions of a protocol stack provided by communication specifications. To this end, the controller 240 may include at least one processor (or controller).

In an embodiment, an AI model trained based on a neural network may be operated through the controller 240 and the storage 230. The controller 240 may be configured by one or multiple processors. The one or multiple processors may include functions of a versatile processor such as a central processing unit (CPU), an application processor (AP), or a digital signal processor (DSP), a dedicated graphics processor such as a graphics processing unit) (GPU) or a vision processing unit (VPU), or a dedicated AI processor such as a neural network processing unit (NPU). The one or multiple processors may control input data to be processed according to an AI model or a predefined operating rule stored in the storage 230. Alternatively, in case that the one or multiple processors are dedicated AI processors, the dedicated AI processors may be designed in a hardware structure customized for processing of a specific AI model. The dedicated AI processors may be included as separate components, instead of being included in the controller 240.

According to an embodiment, the predefined operating rule or AI model is characteristically made through learning. As used herein, "made through learning" means that a basic AI model learns multiple pieces of learning data by a learning algorithm, thereby making a redefined operating rule or an AI model configured to perform desired features (or purposes). Such learning may proceed in the device per se, which implements AI according to the disclosure, or through a separate server and/or system. Examples of the learning algorithm may include supervised learning, unsupervised learning, semi-supervised learning, and reinforcement learning, but are not limited thereto. The controller 240 may learn, through the learning algorithm, events that occur, determinations made, and information that is collected or input. The controller 240 may store the result of such learning in the storage 230 (for example, memory).

The AI model may be configured by multiple neural network layers. Each of the multiple neural network layers may have multiple weight values, and may perform neural network computing through the previous layer's computing result and computing between the weight values. The multiple neural network layers may have multiple weight values optimized by the AI model's learning result. For example, the multiple weight values may be updated such that the loss value or cost value acquired by the AI model during learning processes is decreased or minimized. The artificial neural network may include a deep neural network (DNN), and the examples thereof include a convolutional neural network (CNN), a deep neural network (DNN), a recurrent neural network (RNN), a restricted Boltzmann machine (RBM), a deep belief network (DBN), a bidirectional recurrent deep neural network (BRDNN), a long short term memory (SLTM), or deep Q-networks, but are not limited thereto.

In an embodiment, the controller 240 may execute an algorithm for performing operations for detecting received signals based on artificial intelligence (AI). In an embodiment, the AI model trained to perform operations related to AI-based signal detection may be configured in the controller 240 as hardware, included therein as software, or configured through a combination of hardware and software. In other words, the controller 240 may include an AI-based signal detection controller. The AI-based signal detection controller may perform AI-based signal detection, may identify the detection performance with regard to each signal, may determine whether or not to report the result of identification, and may determine whether or not to use the AI-based signal detection. According to various embodiments, the controller 240 may also include an update unit. The update unit may acquire data updated by the receiver's learning procedure (for example, data related to the receiver's signal detection), and may reconfigure parameters (for example, the neural network structure, node layer-specific information, inter-node weight information) that constitute the neural network, based thereon. The AI-based signal detection controller and the update unit may be a command set or a code stored in the storage 230, particularly a command/code which temporarily resides in the controller 240, or a storage space which stores the command/code, or may be a part of circuitry that constitutes the controller 240. According to various embodiments, the controller 240 may control the base station 110 to perform operations according to various embodiments.

The components of the base station 110 illustrated in FIG. 2 are only examples, and do not limit examples of the base station configured to perform various embodiments of the disclosure. That is, according to various embodiments of the disclosure, some components may be added, deleted, or modified. Alternatively, the same are not necessary components, and the base station may solely include the receive in various embodiments.

Although the base station is described as one entity with reference to FIG. 2, the disclosure is not limited thereto. The base station according to various embodiments of the disclosure may be implemented to form an access network that has distributed deployment, in addition to integrated deployment. According to an embodiment, the base station may be divided into a central unit (CU) and a digital unit (DU), the CU may be implemented to perform upper layer functions (for example, radio link control (RLC), packet data convergence protocol (PDCP), and radio resource control (RRC)), and the DU may be implemented to perform lower layer functions (for example, medium access control (MAC) and physical (PHY)). The base station's DU may form a beam coverage on a radio channel.

Figure 3:
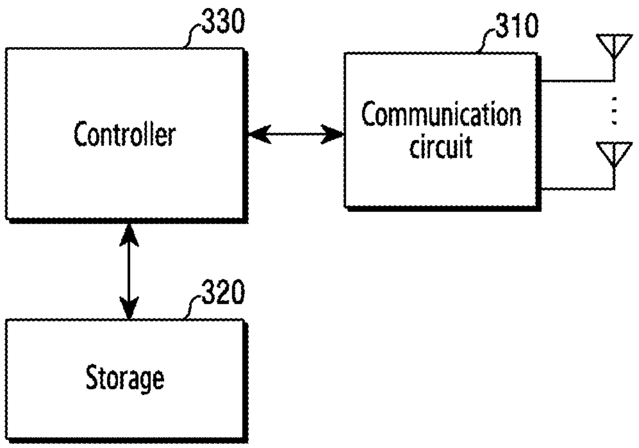
FIG. 3 illustrates an example of the configuration of a UE in a wireless communication system according to embodiments of the disclosure.

FIG. 3 illustrates an example of the configuration of a UE in a wireless communication system according to embodiments of the disclosure. The configuration illustrated in FIG. 3 may be understood as the configuration of the UE 120 or 130. As used herein, terms such as " . . . unit," "-er," and the like may refer to units configured to process at least one function or operation, and the same may be implemented by hardware, software, or a combination of hardware and software.

Referring to FIG. 3, the UE 120 or 130 may include a communication circuit 310, a storage 320, and a controller 330.

The communication circuit 310 performs functions for transmitting/receiving signals through radio channels. For example, the communication circuit 310 performs functions for conversion between baseband signals and bitstrings according to the physical layer specifications of the system. For example, during data transmission, the communication circuit 310 encodes and modulates a transmitted bitstring, thereby generating complex symbol. In addition, during data reception, the communication circuit 310 restores a received bitstring by demodulating and decoding a baseband signal. In addition, the communication circuit 310 up-converts a baseband signal into a radio frequency (RF) band signal, transmits the same through an antenna, and down-converts an RF band signal received through the antenna into a baseband signal. For example, the communication circuit 310 may include a transmission filter, a reception filter, an amplifier, a mixer, an oscillator, a DAC, an ADC, and the like.

In addition, the communication circuit 310 may include multiple transmission/reception paths. Furthermore, the communication circuit 310 may include an antenna unit. The communication circuit 310 may include at least one antenna array configured by multiple antenna elements. In hardware terms, the communication circuit 310 may be configured by a digital circuit and an analog circuit (for example, radio frequency integrated circuit (RFIC)). The digital circuit and analog circuit may be implemented as a single package. In addition, the communication circuit 310 may include multiple RF chains. The communication circuit 310 may perform beamforming. The communication circuit 310 may apply beamforming weights to signals in order to give directivity based on configurations of the controller 330 to signals to be transmitted/received. According to an embodiment, the communication circuit 310 may include a radio frequency (RF) block (or RF unit). The RF block may include first RF circuitry related to antennas and second RF circuitry related to baseband processing. The first RF circuitry may be referred to as an RF-antenna (A). The second RF circuitry may be referred to as an RF-baseband (BB).

In addition, the communication circuit 310 may transmit/receive signals. To this end, the communication circuit 310 may include at least one transceiver. The communication circuit 310 may receive downlink signals. The downlink signals may include a synchronization signal (SS), a reference signal (RS) (for example, cell-specific reference signal (CRS), demodulation (DM)-RS), system information (for example, MIB, SIB, remaining system information (RMSI), other system information (OSI)), a configuration message, control information, downlink data, or the like. In addition, the communication circuit 310 may transmit uplink signals. The uplink signals may include random access-related signals (for example, random access preamble (RAP) (or message 1 (Msg1)), message 3 (Msg3)), reference signals (for example, sound reference signal (SRS), DM-RS), a power headroom report (RHR), or the like.

In addition, the communication circuit 310 may include different communication modules in order to process signals in different frequency bands. Furthermore, the communication circuit 310 may multiple communication modules in order to support multiple different radio access technologies. For example, the different radio access technologies may include Bluetooth low energy (BLE), wireless fidelity (Wi-Fi), Wi-Fi gigabyte (WiGig), cellular networks (for example, long term evolution (LTE), new radio (NR)), and the like. The different frequency bands may include super high frequency (SHF) (for example, 2.5 GHz, 5 Ghz) bands, millimeter wave (for example, 38 GHz, 60 GHz, and the like) band. The communication circuit 310 may also use the same type or radio access technology with regard to different frequency bands (for example, unlicensed bands for licensed assisted access (LAA), citizens broadband radio service (CBRS) (for example, 3.5 GHz)).

The communication circuit 310 transmits and receives signals as described. Accordingly, all or part of the communication circuit 310 may be referred to as "transmitter," "receiver," or "transceiver." In addition, transmission and reception performed through a radio channel, as used in the following description, are intended to include the above-described processing performed by the communication circuit 310.

Various embodiments of the disclosure may include operations (that is, downlink reception) performed according to the receiver included in the communication circuit of the UE, and structure, without being limited to the wireless communication circuit of the base station. For example, the communication circuit 310 may include a receiver which operates and is configured according to various embodiments described hereinafter. To this end, the receiver of the communication circuit 310 may be disposed together with one or more AI model entities for AI computing or a controller for controlling AI models. The receiver of the communication circuit 310 may be controlled by a controller in order to perform operations according to various embodiments.

The storage 320 stores data such as basic programs for operations of the UE 120, application programs, and configuration information. The storage 320 may include a memory. The storage 230 may be configured by a volatile memory, a nonvolatile memory, or a combination of a volatile memory and a nonvolatile memory. The storage 320 provides the stored data at the request of the controller 330. According to an embodiment, the storage 320 may store learning data for AI-based signal detection, and may apply the stored learning data to a neural network structure for AI-based signal detection.

The controller 330 controls overall operations of the UE 120 or 130. For example, the controller 330 transmits and receives signals through the communication circuit 310. In addition, the controller 330 records and reads data in the storage 320. The controller 330 may also perform functions of a protocol stack provided by communication specifications. To this end, the controller 330 may include at least one processor. The controller 330 may include at least one processor (or controller) or a microprocessor, or may be a part of the processor. A part of the communication circuit 310 and the controller 330 may be referred to as a cellular processor (CP). The controller 330 may include various modules for performing communication. According to various embodiments, the controller 330 may control the UE so as to perform various operations according to various embodiments.

In an embodiment, an AI model trained based on a neural network may be operated through the controller 330 and the storage 320. The controller 330 may be configured by one or multiple processors. The one or multiple processors may include functions of a versatile processor such as a central processing unit (CPU), an application processor (AP), or a digital signal processor (DSP), a dedicated graphics processor such as a graphics processing unit (GPU) or a vision processing unit (VPU), or a dedicated AI processor such as a neural network processing unit (NPU). The one or multiple processors may control input data to be processed according to an AI model or a predefined operating rule stored in the storage 320. Alternatively, in case that the one or multiple processors are dedicated AI processors, the dedicated AI processors may be designed in a hardware structure customized for processing of a specific AI model. The dedicated AI processors may be included as separate components, instead of being included in the controller 330.

According to an embodiment, the predefined operating rule or AI model is characteristically made through learning. As used herein, "made through learning" means that a basic AI model learns multiple pieces of learning data by a learning algorithm, thereby making a redefined operating rule or an AI model configured to perform desired features (or purposes). Such learning may proceed in the device per se, which implements AI according to the disclosure, or through a separate server and/or system. Examples of the learning algorithm may include supervised learning, unsupervised learning, semi-supervised learning, and reinforcement learning, but are not limited thereto. The controller 330 may learn, through the learning algorithm, events that occur, determinations made, and information that is collected or input. The controller 330 may store the result of such learning in the storage 320 (for example, memory).

The AI model may be configured by multiple neural network layers. Each of the multiple neural network layers may have multiple weight values, and may perform neural network computing through the previous layer's computing result and computing between the weight values. The multiple neural network layers may have multiple weight values optimized by the AI model's learning result. For example, the multiple weight values may be updated such that the loss value or cost value acquired by the AI model during learning processes is decreased or minimized. The artificial neural network may include a deep neural network (DNN), and the examples thereof include a convolutional neural network (CNN), a deep neural network (DNN), a recurrent neural network (RNN), a restricted Boltzmann machine (RBM), a deep belief network (DBN), a bidirectional recurrent deep neural network (BRDNN), a long short term memory (SLTM), or deep Q-networks, but are not limited thereto.

In an embodiment, the controller 330 may execute an algorithm for performing operations for detecting received signals based on artificial intelligence (AI). In an embodiment, the AI model trained to perform operations related to AI-based signal detection may be configured in the controller 330 as hardware, included therein as software, or configured through a combination of hardware and software. In other words, the controller 330 may include an AI-based signal detection controller. The AI-based signal detection controller may perform AI-based signal detection, may identify the detection performance with regard to each signal, may determine whether or not to report the result of identification, and may determine whether or not to use the AI-based signal detection. According to various embodiments, the controller 330 may also include an update unit. The update unit may acquire data updated by the receiver's learning procedure (for example, data related to the receiver's signal detection), and may reconfigure parameters (for example, the neural network structure, node layer-specific information, inter-node weight information) that constitute the neural network, based thereon. The AI-based signal detection controller and the update unit may be a command set or a code stored in the storage 320, particularly a command/code which temporarily resides in the controller 330, or a storage space which stores the command/code, or may be a part of circuitry that constitutes the controller 330. According to various embodiments, the controller 330 may control the UE 120 or 130 to perform operations according to various embodiments.

The components of the UE 120 or 130 illustrated in FIG. 3 are only examples, and do not limit examples of the UE configured to perform various embodiments of the disclosure. That is, according to various embodiments of the disclosure, some components may be added, deleted, or modified.

Hereinafter, the disclosure will be described with reference to an AI model included in the base station, for convenience of description. That is, the base station may include an AI model which includes a specific neural network structure, and which is trained by a specific algorithm. However, the disclosure is not limited thereto, and is obviously applicable to AI models included in the UE.

According to various embodiments of the disclosure, technologies related to AI-based signal detection may include a step of training and configuring a specific AI model, based on a specific algorithm, in order to apply feedback regarding received signal detection to the specific AI model, a step of collecting learning data requested for the specific AI model's learning process, a step of verifying the trained specific AI model's performance, and the like. Particularly, the disclosure may further include an operation in which, in connection with the step of verifying the trained specific AI model's performance, the UE detects signals, based on the AI model, and reports the result of detection such that signals are detected based on the optimal AI model.

An AI model-based signal detection method of the disclosure will be described with reference to a transformer neural network as an example of the AI model for convenience of description. However, the disclosure is not limited thereto, and is obviously applicable to all AI models which, in connection with signal detection, is capable of signal detection-related computing with regard to a feature domain and a spatial domain.

Figure 4:
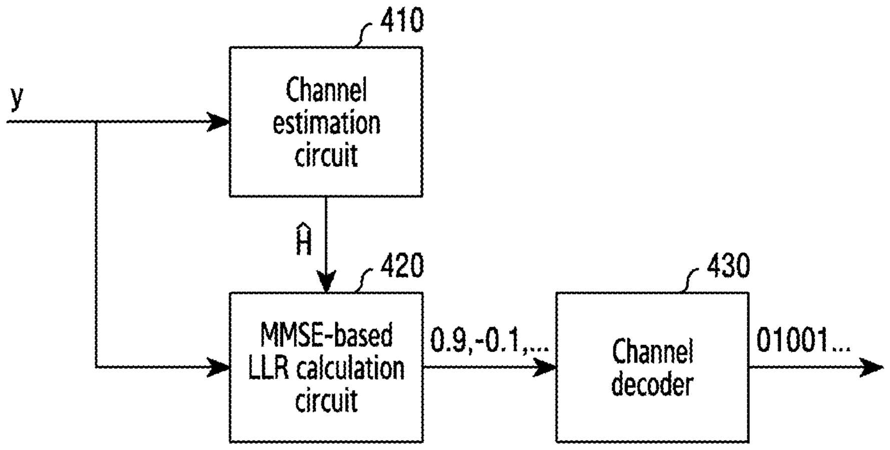
FIG. 4 illustrates the structure of a receiver for detecting signals according to embodiments of the disclosure.

FIG. 4 illustrates the structure of a receiver for detecting signals according to embodiments of the disclosure. More specifically, FIG. 4 illustrates a general receiver configured to perform reception and signal detection operations through MMSE-based LLR calculations, in order to perform linear detection based on received signals.

Referring to FIG. 4, the receiver may include a channel estimation circuit 410, a minimum mean square error (MMSE)-based log likelihood ratio (LLR) calculation circuit 420, and a channel decoder 430. The channel estimation circuit 410 may estimate a channel, based on a received signal y. The MMSE-based R-LLR calculations circuit may calculate the R-LLR, based on the received signal and the estimated channel. The channel decoder 430 may decode the channel and the received signal, based on the calculated LLR.

Hereinafter, signs of the following equations may be defined for convenience of description. CN(0, $\sigma^2$) refers to a circular symmetric Gaussian distribution having an average of 0 and a variance of $\sigma^2$·$[\cdot]^T$ refers to a vector or matrix's transpose, and $[\cdot]^H$ refers to a vector or matrix's conjugate transpose. In connection with vector y=[$y^1$, $y^2$, . . . $y^n$], ||y|| refers to $\ell^2$ norm, and |·| refers to the absolute value of a complex point. With regard to two sets, {·}/{·} refers to the sets' subtraction operation. For example, {a, b, c}/{a}={b, c}. Ω refers to a set of complex constellation points, and |Ω| refers to the number of constellation points.

Hereinafter, equations related to the receiver will be described based on an assumption that the communication channel is configured by two transmission antennas and as many reception antennas as $N^r$, but this is only an example for the receiver's signal detection, and various embodiments are obviously not limited thereto. Hereinafter, equation 1 describes the relationship between transmitted signals and received signals.

$$y = Hx + z$$
$$y = [y_1 y_2 \cdots y_{n_R}]^T$$
$$x = [x_1 x_2]^T$$
$$z = [z_1 z_2 \cdots z_{n_R}]^T\ .$$
$$H = \begin{bmatrix} h_{11} & h_{12} \\ h_{21} & h_{22} \\ \vdots & \vdots \\ h_{n_R 1} & h_{n_R 2} \end{bmatrix}$$

In equation 1, y refers to a received signal vector, x refers to a transmitted signal vector, z refers to a noise vector, and H refers to a channel gain matrix. $x_i$(i=1,2) refers to a signal transmitted from the ith transmission antenna, and $y_j$(j=1,2, . . . , $n_R$) refers to a signal received by the jth reception antenna. $h_{ji}$(j=1,2, . . . , $n_R$, i=1,2) refers to the channel gain between the ith transmission antenna and the jth reception antenna. It is assumed that noise $$z_j \sim CN(0, \sigma_z^2)(j = 1, 2, \ldots, n_R)$$

is circular symmetric white Gaussian noise. It is also assumed that transmitted signal $x_i$(i=1,2) is a symbol modulated in the |Ω|—QAM (Quadrature Amplitude Modulation) scheme. However, this is only an example for MMSE-based LLR computing, and various embodiments are not limited thereto.

Equation 1 may be modified to equation 2 as follow:

$$y = h_1 x_1 + h_2 x_2 + z \qquad \text{Equation 2}$$

wherein $h_i$=$[h_{1i} h_{2i} \ldots h_{nRi}]^T$ (i=1, 2) refers to the $i^{th}$ column of the channel gain matrix H.

By means of equation 2, the MMSE solution regarding the first stream may be expressed by equation 3 as follows:

$$\begin{aligned} x_1, MMSE &= w_1 y \\ &= w_1 h_1 x_1 + w_1 h_2 x_2 + w_1 z \\ &= \rho x_1 + I_1 + z_1' \\ &\approx x_1 + z_1'' \end{aligned} \qquad \text{Equation 3}$$

In equation 3, $W_1$=$[w_{11} w_{22} \ldots w_{1nR}]$ refers to the first row vector of the MMSE filter. Assuming that $$z_1''$$

which is expressed as the sum of interference component $I_1$ regarding the first stream and noise $$z_1'$$

refers to circular symmetric white Gaussian noise, and $\tilde{x}_{1,MMSE}$ and $\tilde{x}_{2,MMSE}$ which are MMSE solutions regarding each stream are independent of each other, the probability density function of conditional probabilities that $\tilde{x}_{1,MMSE}$ may be detected, when $X_1$ is transmitted, may be expressed by equation 4 as follows:

$$P(\tilde{x}_{1,MMSE} \mid x_1) = \frac{1}{\sqrt{2\pi\sigma_1^2}} \exp\left(-\frac{|\tilde{x}_{1,MMSE} - x_1|^2}{2\sigma_1^2}\right) \quad \text{Equation 4}$$

Assuming that, based on equation 4, all transmitted symbols have the same transmission probability, the LLR function regarding the $k^{th}$ bit of the first stream may be expressed by equation 5 as follows:

$$\begin{aligned} LLR(b_{k,1}) &= \ln\frac{\sum_{x_i \in S_k^+} p(x_i \mid \tilde{x}_{1,MMSE})}{\sum_{x_j \in S_k^-} p(x_j \mid \tilde{x}_{1,MMSE})} \\ &= \ln\frac{\sum_{x_i \in S_k^+} p(\tilde{x}_{1,MMSE} \mid x_i) p(x_i)}{\sum_{x_j \in S_k^-} p(\tilde{x}_{1,MMSE} \mid x_j) p(x_j)} \\ &= \ln\frac{\sum_{x_i \in S_k^+} p(\tilde{x}_{1,MMSE} \mid x_i)}{\sum_{x_j \in S_k^-} p(\tilde{x}_{1,MMSE} \mid x_j)} \end{aligned} \quad \text{Equation 5}$$

wherein $b_{k,1}$ refers to the $k^{th}$ bit of the first stream, $$S_k^+$$

refers to a symbol set, the $k^{th}$ bit of which is 1, and $$S_k^-$$

refers to a symbol set, the $k^{th}$ bit of which is 0. The following equation 6 may be acquired by performing Max-log approximation with regard to equation 5.

$$\begin{aligned} LLR(b_{k,1}) &\approx \ln\frac{\max_{x_i \in S_k^+} p(\tilde{x}_{1,MMSE} \mid x_i)}{\max_{x_j \in S_k^-} p(\tilde{x}_{1,MMSE} \mid x_j)} \\ &= \frac{1}{2\sigma_1^2}\left(\left|\tilde{x}_{1,MMSE} - x_{1,k,-}^{opt}\right|^2 - \left|\tilde{x}_{1,MMSE} - x_{1,k,+}^{opt}\right|^2\right) \end{aligned} \quad \text{Equation 6}$$

In equation 6, $$x_{1,k,+}^{opt} = \underset{x \in S_k^+}{\operatorname{argmax}} |\tilde{x}_{1,MMSE} - x|^2,\ x_{1,k,-}^{opt} = \underset{x \in S_k^-}{\operatorname{argmax}} |\tilde{x}_{1,MMSE} - x|^2, \text{ and}$$

$$\sigma_1^2 = E\left[|I_1 + z_1'|^2\right] \approx E\left[|I_1|^2\right] + E\left[|z_1'|^2\right] = E_x |w_1 h_1|^2 + \sigma_z^2 \|w_1\|^2$$

may hold.

Equation 6 may refer to an LLR function in case that each stream has a different signal-to-interference noise ratio (SINR). If the power of noise regarding each stream is identical, each stream may be multiplied by the same weight, thereby outputting the same result through the cannel decoder, and equation 6 may be modified as in equation 7 below:

$$LLR(b_{k,i}) = \left|\tilde{x}_{i,MMSE} - x_{i,k,-}^{opt}\right|^2 - \left|\tilde{x}_{i,MMSE} - x_{i,k,+}^{opt}\right|^2 \quad \text{Equation 7}$$

For example, in equation 7, the LLR may be calculated to be the difference between squared Euclidean distances of $$x_{1,1,-}^{opt} \text{ and } x_{1,1,+}^{opt}$$

with regard to an estimated transmitted symbol $\tilde{x}_{1,MMSE} = \tilde{x}_R + j\tilde{x}_1$.

Hereinafter, the structure and operation of a receiver for performing the above-described LLR calculation more efficiently and accurately, according to various embodiments of the disclosure, will be described. More specifically, the receiver according to various embodiments may include an AI model for the LLR calculation, and the UE or base station may include the above-mentioned receiver. Hereinafter, a structure including an AI model for signal detection-based LLR calculation will be described in more detail.

According to various embodiments of the disclosure, multiuser multiple-input and multiple-output (MU-MIMO) technology may be considered an essential element of a 5G-ultra wireless network capable of coping with increasing uplink data traffic demands. Particularly, design of an efficient receiver for signal detection on the digital unit (DU) side may be followed by increased fronthaul load and increased spectrum efficiency. Hereinafter, according to various embodiments, an AI-based MU-MIMO detection method which is applicable to an NPU-embedded radio access network (RAN) device will be described in detail. Particularly, a structure and a scheme for efficient detection capable of accomplishing the maximum likelihood-type block error rate (BLER) performance, while reducing complexity, will be disclosed. However, the DU-side receiver design is only an example, and the receiver and AI model described hereinafter, according to various embodiments, may obviously be applied or disposed on the UE.

More specifically, various embodiments may include a new neural receiver structure based on a transformer model, and this may be referred to as a swap transformer-based neural receiver (ST-NR). In addition, various embodiments may include a dual multi-head attention model which uses features of multiple domains regarding the space, time, and frequency in common, in order to detect transmitted symbols, as major characteristics that may differentiate the same from transformer models. By introducing the ST-NR, the performance efficiency according to a 3GPP-based channel may cause a signal-to-noise-ratio (SNR) gain of 3 dB or higher, thereby accomplishing a performance which is superior to that of detection algorithms, and which is close to the theoretical maximum likelihood.

As described above, there have been increasing requests to improve the spectrum efficiency in 5G-ultra wireless communication systems. Particularly, there is a request for a scheme for reducing the fronthaul load necessary for the target system throughput in uplink systems. In order to accomplish the two requests, it may be necessary to design a MU-MIMO receiver which supports accurate layer-specific symbol detection while maintaining a reasonable level of calculation complexity. General maximum likelihood detectors may be useful in accomplishing optimal performance. However, it is requested to use all possible transmitted symbol combinations, and this necessary to have a tremendous degree of complexity due to detailed searching, thereby making realistic implementation difficult. As an alternatively, various linear detectors such as zero-force (ZF) detectors or linear-MMSE (LMMSE) detectors described with reference to FIG. 4 may be widely used, in order to substantially implement detection at a low level of complexity. However, linear detectors may have seriously degraded detection quality in case that the number of transmission MIMO layers is similar to the reception antenna's layers (for example, 4×4 and 8×8 MIMO scenarios).

According to various embodiments of the disclosure, in order to overcome the problems of signal detection methods described above, it is provided to design a new neural receiver using a transformer structure. A signal detection scheme based on an ST-NR may extract multi-domain signal features, and may accurately estimate soft bits based thereon. According to an embodiment, compared with transformers, the largest characteristics of the swap transformer lie in the fact that the dual multi-head attention (MHA) computing which applies weighted cross-covariance throughout the entire input sequence may be performed based on different domains. That is, with regard to an orthogonal frequency division multiplexing (OFDM) resource grid (for example, time domain and frequency domain) and spatial signal space (for example, spatial domain), two MHA algorithms may be computed. By concatenating the two attention outputs described above, the ST-NR may accurately detect the transmitted signal's symbol. In addition to the above-described characteristics, the ST-NR may accomplish the maximum likelihood (or almost maximum likelihood) performance even in a higher-order scenario.

Hereinafter, a general AI model (for example, CNN model-based DeepRx) used for a receiver or a general transformer model including multi-head attention will be described.

Figure 5:
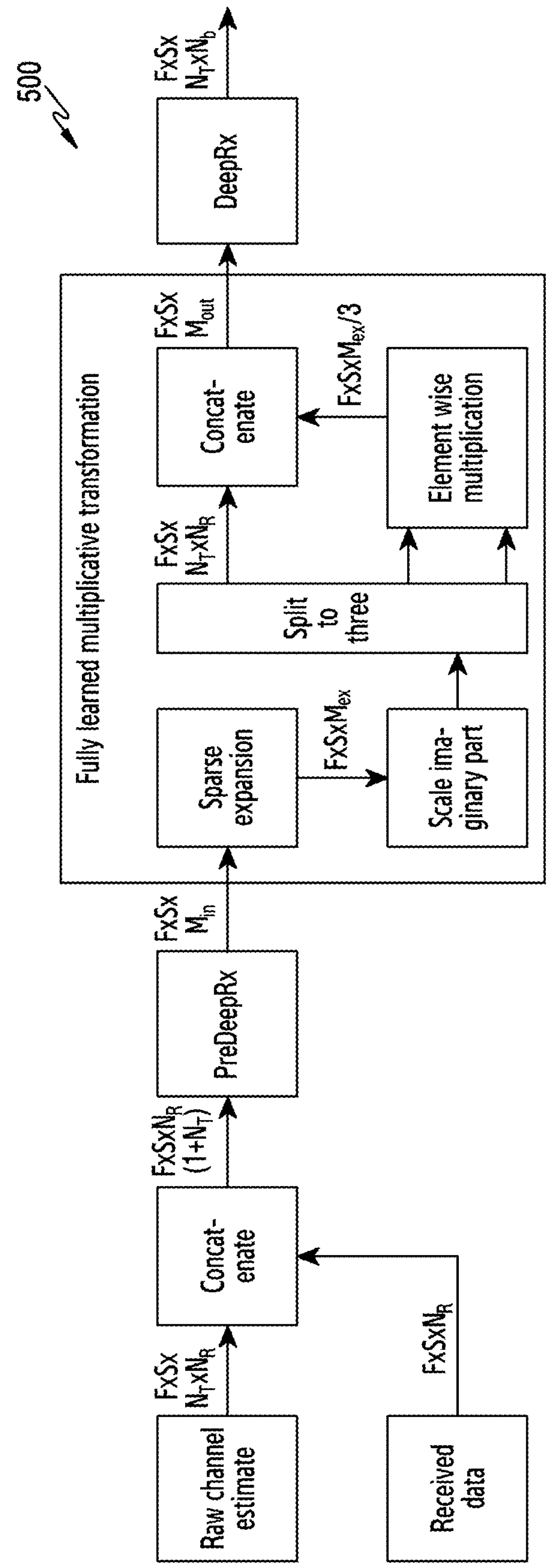
FIG. 5 illustrates the structure of circuits for detecting signals, based on a CNN model, according to embodiments of the disclosure.

FIG. 5 illustrates the structure of circuits for detecting signals, based on a convolution neural network (CNN) model, according to embodiments of the disclosure. More specifically, FIG. 5 illustrates an example of a receiver 500 using the CNN model's DeepRx structure, as a machine learning (ML)-based receiver.

Referring to FIG. 5, the receiver 500 using the DeepRx structure may separate multiple overlapping spatial streams during equalization and symbol detection intervals, for the sake of MINO detection. Specifically, FIG. 5 illustrates a MIMO DeepRx structure that uses fully learned multiplicative preprocessing. Through the learned multiplicative layer, the neural network may learn which input or channel is to be learned, and may provide the same to the basic DeepRx part.

For example, an estimated low channel value ($F \times S \times N_t \times N_R$) and received data ($F \times S \times N_R$) may be concatenated and provided to a residual neural network (ResNet) (for example, configured by three blocks) which is referred to as PreDeepRx. Accordingly, the PreDeepRx may provide calculated input data arrays (for example, $\tilde{z}$) to a multiplicative preprocessing unit, which may include, as its core functions, sparse selection of an input component for multiplication and learned scaling of a virtual part that represents the type of generalized complex conjugation.

For example, an input data array regarding a specific resource may be an expanded channel having a sparse matrix, and this may be defined by learning a method for selecting an input channel for multiplication. Thereafter, each channel's virtual part may be scaled, and split into three vectors having the same size. Some of the split vectors may undergo element-wise multiplication, and these may be concatenated and converted into an output for processing in a DeepRx block (for example, configured by eleven ResNet blocks).

As described above, the CNN-based signal detection receiver in FIG. 5 may use channel H and received signal y as input values. However, the CNN model-based receiver does not consider noise elements, thereby failing to perform more accurate signal detection, and may have a substantially lower level of BLER performance than a transformer model that uses multi-head attention. That is, the transformer model-based receiver according to various embodiments described hereinafter may additionally use noise elements (for example, X, $\sigma^2$), thereby accomplishing a high rate of training convergence, and may perform noise-related error compensation.

Figure 6:
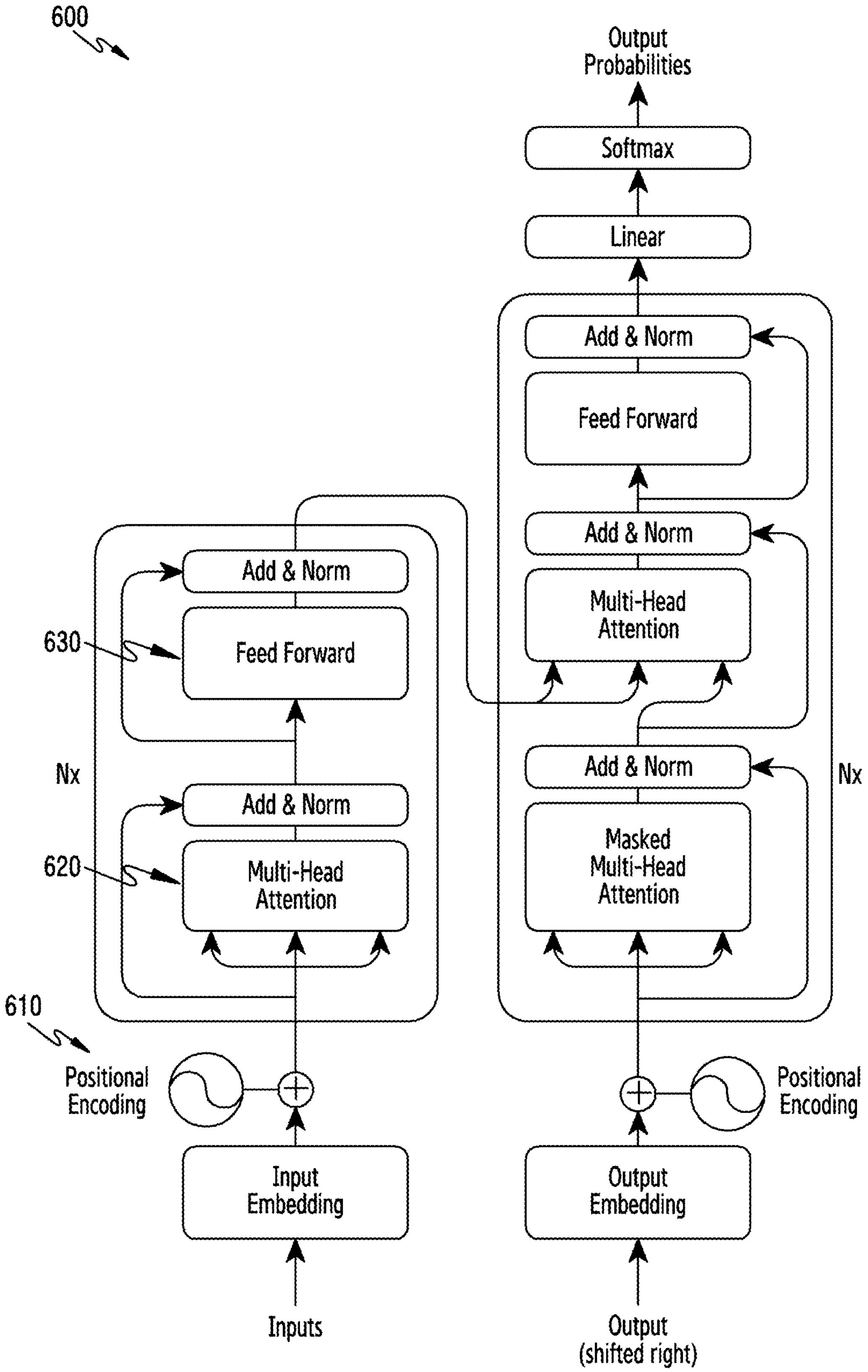
FIG. 6 illustrates the structure of circuits for performing computation based on a transformer model according to embodiments of the disclosure.

FIG. 6 illustrates the structure of circuits for performing computation based on a transformer model according to embodiments of the disclosure. More specifically, FIG. 6 illustrates an example of a transformer model 600 for performing attention computation.

A general AI model (for example, seq2seq model) is configured in an encoder-decoder structure, the encoder may compress an input sequence into one vector expression, and the decoder may generate an output sequence through this vector expression. However, such a structure may have a shortcoming in that, in the process in which the encoder compresses an input sequence into one vector expression, a part of the information of the input sequence is lost. The attention mechanism has been introduced to solve this shortcoming.

The attention may include a mechanism for referencing the encoder's entire input data one more time in each time step in which the decoder predicts the output word, because numerical information output at the last time step of the encoder is insufficient. However, the attention mechanism may be characterized in that, instead of referencing the entire input data at the same ratio, data most associated with the feature to be predicted at the corresponding time step is reference in a more concentrated manner. That is, from the mathematical viewpoint, the attention mechanism may be characterized in that the decoder's current time step's output value (hidden state) is multiplied by a weight, thereby generating a query, and this undergoes dot product with the entire encoder's time step output value, thereby learning the corresponding weights through backpropagation such that features to be predicted can be referenced.

According to various embodiments of the disclosure, referring to FIG. 6, the transformer model 600 may include an input embedding unit and a positioning encoding unit 610. RNN models are characterized in that, according to the position of requested features, such features are successively input and then processed, that is, each feature's position information may be known. To the contrary, a transformer may be provided to acquire each piece of position information in a different manner, instead of successively acquiring inputs regarding respective features. In order to each feature-specific position information, the transformer may add position information to each feature's embedding vector and use the same as the model's input, and such a procedure may be referred to as positional encoding.

Referring to FIG. 6, an input-based embedding vector may undergo a positioning encoding procedure and may be subjected to attention computation in the multi-head attention unit 620. The attention mechanism is a core function of the transformer model, and may refer to an algorithm (for example, self-attention) capable of identifying data-specific importance without external information. As illustrated in FIG. 6, the transformer model 600 may include an input-based encoder and an output-based decoder. The encoder may include a unit configured to perform self-attention 620, and the decoder may include masked attention and cross self-attention.

Referring to FIG. 6, according to an embodiment, the multi-attention configured by one or more self-attention module, which is one of important characteristics of the transformer model, may compute input data and output data with the same size. For example, the transformer model 600 may reduce the size of data through projection computing such as embedding, and may perform multi-head attention such that self-attention is performed multiple times.

Referring to FIG. 6, data that is output as the result of attention may be subjected to computation having nonlinearity added thereto, through a feed forward unit (for example, feed forward neural network). Thereafter, the result may undergo normalization regarding the layer with regard to each piece of data.

According to the transformer model 600, after encoding decoding procedures are performed N times in the encoder and decoder described above, the final output probability may be derived through the Linear and Softmax.

The transformer model 600 described above with reference to FIG. 6 may substantially increase the computing speed through batch processing of input data, and may effectively lower the degree of complexity of big-sized data as well, by using the attention mechanism, compared with AI models.

In addition, the receiver for transformer-based signal detection according to various embodiments of the disclosure may be characterized in that the same perform the computation of dual multi-head attention by using [SF, $(N_r+1)(N_r+1)$] as an input dimension, RE-wise MHA as an SF dimension, and spatial-domain MHA as a $(N_r+1)(N_r+1)$ dimension, unlike the above-described transformer model which simply has [seq_len, num_feature] as an input dimension, and which performs the computation of multi-head attention with regard to the feature domain only. Particularly, in case of using a general transformer model that performs attention computation with regard to one direction, it may be difficult to extract a sufficient number of features with regard to the spatial domain. The transformer-based receiver according to various embodiments, described hereinafter in detail, may be characterized in that the same may learn the correlation between resource elements and the correlation between antennas in the spatial domain.

According to various embodiments of the disclosure, a MIMO-OFDM system including $N_t$ transmission layers and $N_r$ reception antennas may be assumed. Each transmission layer may transmit a bit sequence having a length of $2^C$ on all resource elements (REs). To this end, each bit sequence may be mapped to C-QAM symbols among constellation points. Thereafter, $x_{ij} \in \mathbb{C}^{N_t}$ which is a symbol vector of the ith subcarrier, configured by transmission symbols, and the jth symbol may be spatially multiplexed into as many streams as $N_t$ through a MIMO channel, $H_{ij} \in \mathbb{C}^{N_r \times N_t}$. $y_{ij} \in \mathbb{C}^{N_r}$ which is a received signal vector may be expressed $y_{ij}=H_{ij}x_{ij}+n_{ij}$, wherein $n_{ij}$ may refer to complex Gaussian noise (which may include, for example, a signal to interference-plus-noise ratio (SINR) value) having noise variance $\sigma^2$.

Various embodiments of the disclosure may include a method and a structure for accurately estimating soft bits (for example, LLR) in a coded system with regard to channel $H_{ij}$. Hereinafter, in addition to the description of the receiver for calculating the LLR in FIG. 4, the CCR calculation according to the disclosure will be described in more detail. For convenience of description regarding the LLR, subscripts i and j may be omitted. By using the Baye's rule and max-log approximation, the LLR regarding the nth bit of the lth MIMO layer, based on the maximum likelihood approach, may be described as in equation 8 below:

$$\lambda_{c_l^n} \approx \frac{1}{\sigma^2}\left( \min_{x \in X_l^{(0)}} \|y - Hx\|^2 - \min_{x \in X_l^{(1)}} \|y - Hx\|^2 \right) \quad \text{Equation 8}$$

Referring to equation 8, $$c_l^n$$

may refer to the nth bit of the lth MIMO layer symbol, and $$X_l^{(0)} \text{ and } X_l^{(1)}$$

may refer to sets of constellation points satisfying $$c_l^n = 0 \text{ and } c_l^n = 1,$$

respectively. Referring to equation 8, the maximum likelihood detection may perform a searching operation for all possible candidates of x in order to fine the minimum value of $\|y-Hx\|^2$ in each set, and this may substantially increase the degree of complexity of $\mathcal{O}(C^{N_t})$. Therefore, the maximum likelihood approach may be inappropriate to be applied to a MIMO system including a large number of $N_t$ and a high-order modulation scheme (for example, 256 QAM or 1 kQAM).

Hereinafter, the structure of a receiver including a transformer-based neural unit and a method for signal detection will be described in detail.

Figure 7:
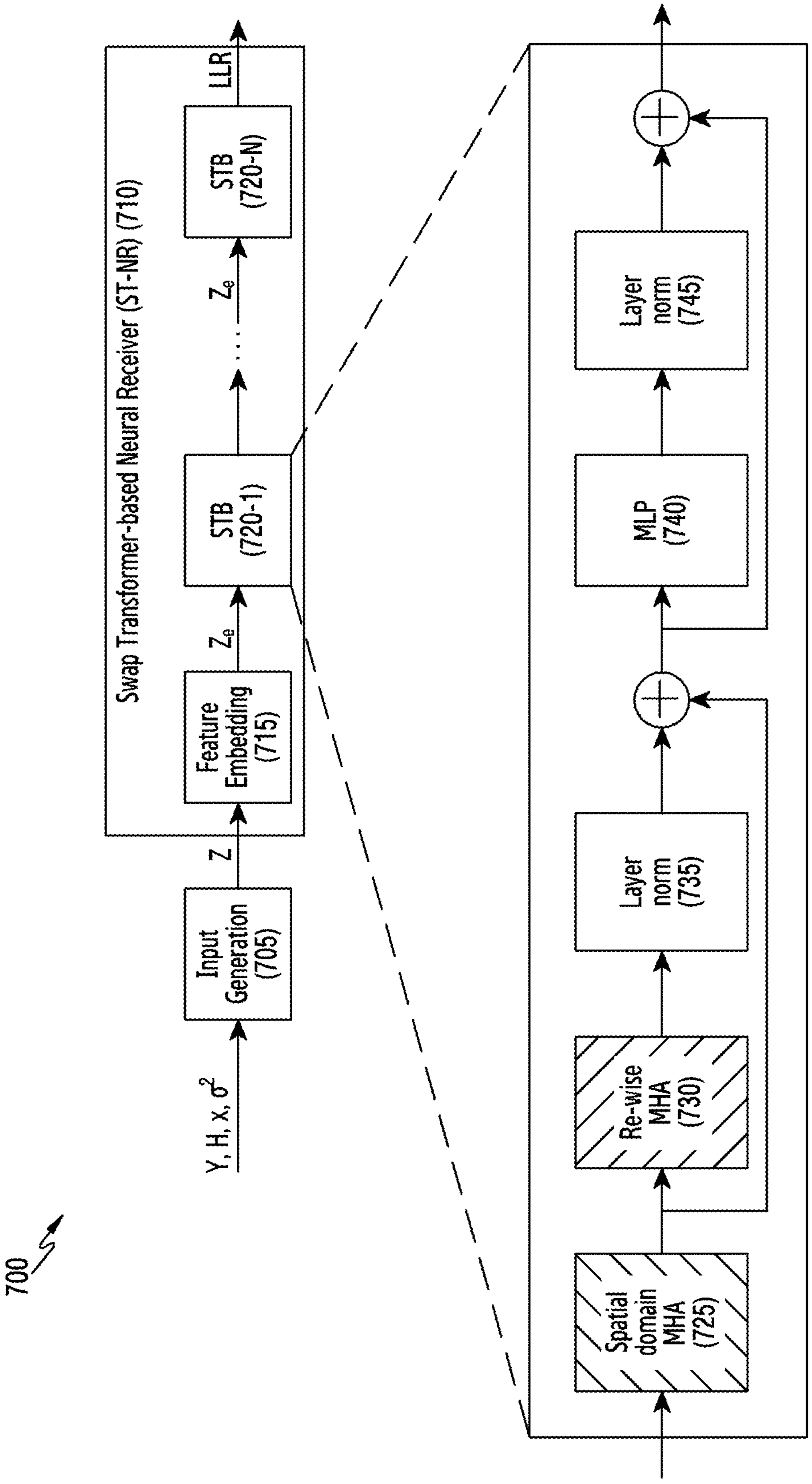
FIG. 7 illustrates an example of a transformer-based neural unit of a receiver according to embodiments of the disclosure.

FIG. 7 illustrates an example of a transformer-based neural unit of a receiver according to embodiments of the disclosure. More specifically, FIG. 7 illustrates a swap transformer-based neural unit 710 for computing the LLR according to an estimated channel, based on a received signal.

Referring to FIG. 7, the receiver 700 may include a channel estimation circuit (not illustrated) configured to estimate a channel, based on a received signal, an input generation unit 705 configured to generate an input for the transformer model, and a transformer unit 710 (for example, swap transformer-based neural receiver). The transformer unit 710 may include a feature embedding block 715 for projecting and embedding an input signal's feature, and at least one transformer block 720-1 . . . 720-N (for example, swap transformer block (STB)) for performing an algorithm for performing LLR computation. The transformer block 720-1 may include an entity 725 for spatial domain MHA (SD MHA) for performing spatial domain multi-head attention computation, and an entity for RE-wise MHA 730 for performing resource element domain (for example, time domain and frequency domain) multi-head attention. The transformer block 720-1 may further include at least one of layer normalization entities 735 and 745 for normalizing a computed layer, or a multi-layer perceptron (MLP) entity for computing the LLR of an output signal, based on the multi-head attention computation result. According to an embodiment, each entity including an entity for each multi-head attention computation may include a module for each computation. Hereinafter, respective blocks and entities will be described in detail.

More specifically, the transformer unit 710 may include a feature embedding block (for example, feature embedding layer) 715 for embedding features, and at least one transformer block 720-1 . . . 720-N. A stacked array $[Y, H, \Sigma, \tilde{X}] \in \mathbb{C}^{SF\times(N_t+1)(N_r+1)}$ may be given, with regard to five OFDM symbols and as many subcarriers as F, as an input to the transformer unit 710. In this connection, respective elements correspond to a stacked matrix of $$y_{ij}, H_{ij}, \sigma_{ij}^2 = \sigma^2$$

according to every i and j, and may be an LMMSE-filtered symbol vector $$\tilde{x}_{ij} = \left(H_{ij}^H H_{ij} + \sigma^2 I\right)^{-1} H_{ij}^H y_{ij}.$$

According to an embodiment, by using $\tilde{x}_{ij}$, the transformer unit 710 may primarily filter symbol distortion caused by the channel and noise, thereby easily extracting unique symbol features. However, according to an embodiment, $\tilde{X}$ may be an element what is selectively excluded. In this case, the transformer unit 710 may perform signal detection by solely using inputs according to Y, H, Σ.

According to an embodiment, in order to use a real-valued neural network module, the input of $Z=[\Re\{Z\}, \Im\{Z\}] \in \mathbb{R}^{SF\times N_d}$ in case that $N_d=2(N_t+1)(N_r+1)$ may be generated, and the generated Z may be provided to the transformer unit 710 configured by a feature embedding layer 715 and at least one transformer block 720-1 . . . 720-N. The feature embedding, as used herein, may include vectorization for mapping such that a pattern is identified from each feature of a signal, and similar features are extracted or classified. The feature embedding layer 715 may project $N_d$ features into high-dimensional E features. Accordingly, the transformer unit 710 may infer the correlation between intrinsic features more easily. Thereafter, the embedded feature vector $Z_e \in \mathbb{R}^{SF\times E}$ may be transferred to at least one transformer block 720-1 . . . 720-N.

According to an embodiment, the transformer block 720-1 may include two distinctive MHA modules.

Firstly, the SD MHA module 725 may apply the attention mechanism to E spatially embedded features. Specifically, the SD MHA module 725 may calculate the cross-covariance between E features, and may update the input according to the resulting covariance value's size. Therefore, through such a process, the transformer block 720-1 may extract spatial domain signal features first, thereby detecting layer-specific symbols efficiently.

Secondly, the RE-wise module 730 may apply the attention mechanism to SF REs, thereby acquiring the cross-covariance regarding the RE domain. Thereafter, the RE-wise module 730 may update the value input from the SD MHA module 725 by using the acquiring covariance value. Through such a process, the transformer block 720-1 may extract correlation features between the time domain and frequency domain on the OFDM grid. That is, the transformer block 720-1 may calculate elements between highly correlated antennas, and may reflect and output the same. According to various embodiments of the disclosure, the RE-wise module 730 updates the channel, based on the value input from the SD MHA module 725, but this process is only an example, and attention computation of resource element domain features may be performed prior to attention computation of spatial domain features, according to the order in which respective modules are disposed. For example, the SD MHA module 725 may update the value input from the RE-wise module 730 by using the covariance value, and various examples regarding thereto are illustrated in detail in FIG. 8 to FIG. 10.

According to an embodiment, after an embedded input passes through two consecutive dual MHA modules, the layer normalization module may perform layer normalization, and the SD MHA's output may be added thereto (for example, residual connection). Thereafter, a fully connected layer-based multi-layer perceptron (MLP) module performs computation, and layer normalization may be performed accordingly. According to an embodiment, after passing at least one transformer block 720-1, the completely computed output value is $L \in \mathbb{C}^{F\times S\times N_t\times M}$, which may be the LLR value of M bits regarding $N_t$ layers. According to an embodiment, after passing at least one transformer block 720-1, $N_t \log_2 C$ output values may be mapped to $N_t \log_2 C$ bit probabilities that indicate the likelihood of zero bit according to a sigmoid activation function. According to an embodiment, the sigmoid function is an activation function for converting inputs in an artificial neural network, outputs values between 0 and 1, and may include a function used to convert input values to probabilities. Accordingly, the sigmoid function may be used to calculate the LLR for channel decoding.

According to various embodiments of the disclosure, the transformer model of the transformer unit 710 may under learning or training, based on the above-described procedures. In the learning step, the cross-entropy (CE) between a ground-truth bit vector b corresponding to an actual value and a predicted bit vector $\tilde{b}$ may be used as a loss function regarding each data sample. For example, the transformer unit 710 may calculate the uncertainty between a bit vector corresponding to an actual value and a predicted bit vector on different probability distributions, and may train the transformer AI model by using the cross-entropy value resulting therefrom.

According to an embodiment, in order to alleviate different bit error levels according to each signal-to-noise ratio (SNR), the transformer unit 710 may assign weights to the cross-entropy by using respective SNR values. For example, the calculated loss function may be $L=\log_2(1+snr)CE(b, \tilde{b})$, wherein snr may be the SNR's linear scale value. For example, the model of the transformer unit 710 may be trained by using each SNR value per se, thereby enabling more accurate and adaptive learning.

Figure 8:
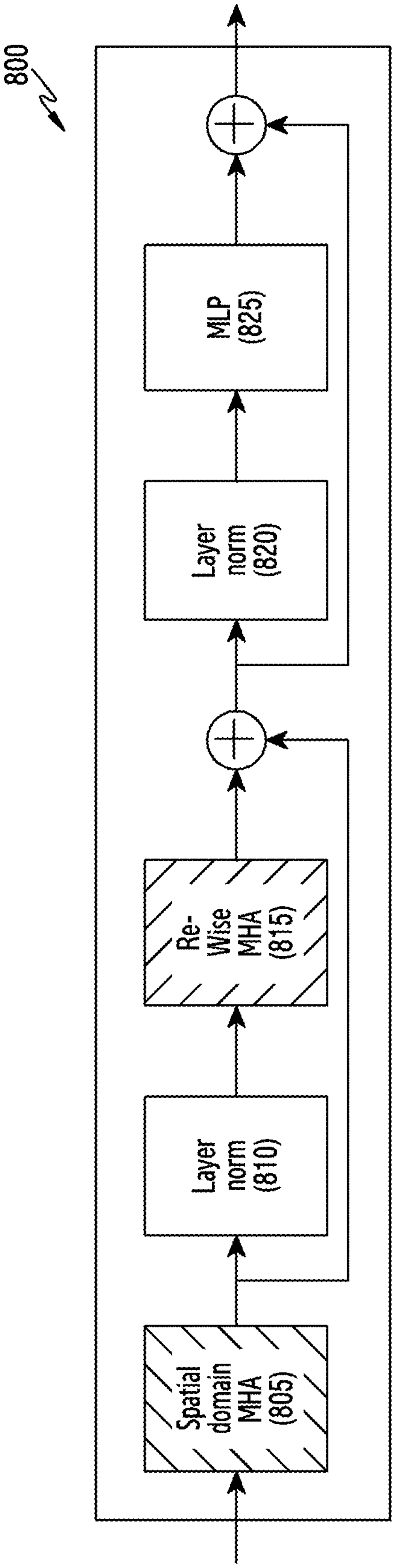
FIG. 8 to FIG. 10 illustrate various examples including the structure of a transformer block according to various embodiments of the disclosure.
Figure 9:
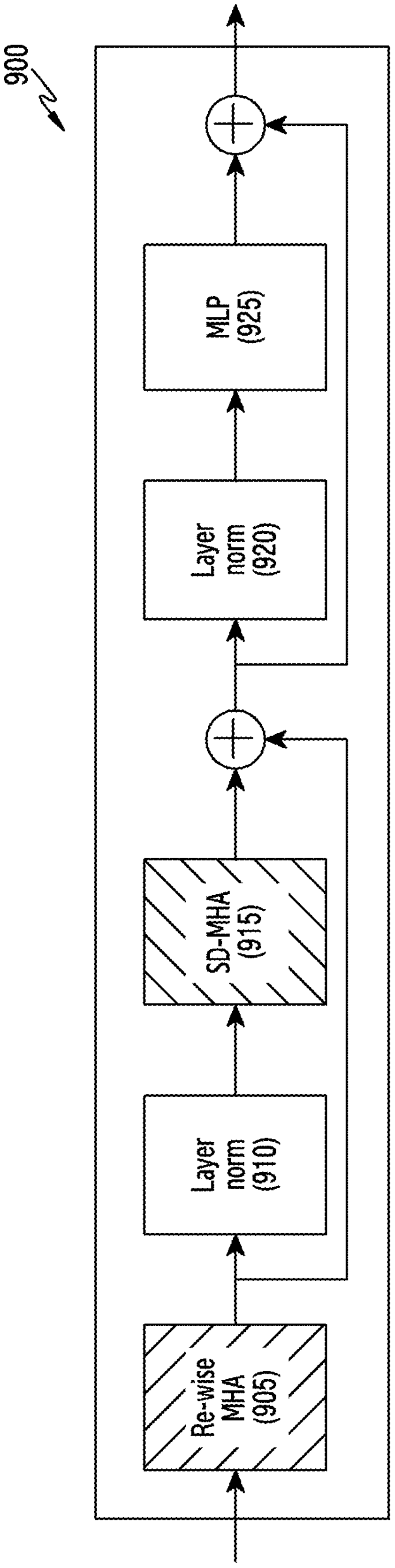
Figure 10:
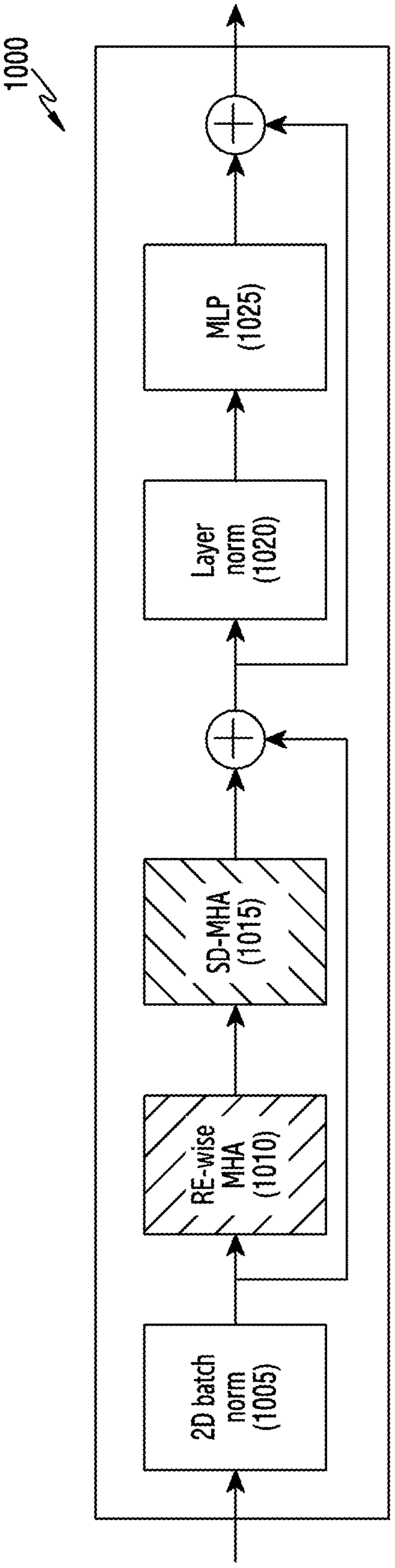

FIG. 8 to FIG. 10 illustrate various examples including the structure of a transformer block according to various embodiments of the disclosure. More specifically, various structure of the transformer model-based receiver and a detailed signal processing method thereby will be described with reference to FIG. 8 to FIG. 10.

According to various embodiments, the variance of amplitudes and phases may substantially vary according to the mobility/scatter effect of channels and received signals in communication environments. Therefore, the larger the input's variance, the more degraded the AI model's learning capability may be, and it may thus be important to normalize data, based on an appropriate axis, according to each environment. Hereinafter, structures of a transformer block according to various examples, which may be configured for respective situations, will be described. However, the following examples are exemplary and are not limitative. For example, the module that performs layer normalization may be added to the structures illustrated in FIG. 8 to FIG. 10 or deleted therefrom. In addition, respective entities will be described below as modules, but may obviously include various kinds of hardware/software entities that perform substantially the same functions, without limited thereto.

Referring to FIG. 8, the transformer block 800 according to various embodiments may include an SD MHA module 805, a first layer normalization module 810, a RE-wise module 815, a residual skip connection point which connects to the previous layer's data to directly use the same, a second layer normalization module 820, and an MLP module 825.

According to an embodiment, the SD MHA module 805 may apply an attention mechanism to E features that have been spatially embedded and input. Specifically, the SD MHA module 805 may calculate the cross-covariance between E features, and may update the input according to the resulting covariance value's size. The transformer block 800 may extract spatial domain signal features first, thereby detecting layer-specific symbols efficiently.

According to an embodiment, after the embedded input passes through the SD MHA module, the first layer normalization 810 may perform layer normalization, and the result may be transferred to the RE-wise module 815.

According to an embodiment, the RE-wise module 815 may apply the attention mechanism to SF REs, thereby acquiring the cross-covariance regarding the RE domain. Thereafter, the RE-wise module 815 may update the information that has been input from the SD MHA module 805 and then normalized, by using the acquired covariance value. Through such a process, the transformer block 800 may extract correlation features between the time domain and frequency domain on the OFDM grid. That is, the transformer block 800 may calculate elements between highly correlated antennas, and may reflect and output the same.

According to an embodiment, data output from the SD MHA module 805 may be added to the data that has passed through the RE-wise module 815 as a residual connection. With regard to the result thereof, the second layer normalization module 820 may perform layer normalization. Thereafter, the fully connected layer-based MLP module 825 performs computation, and the same may be connected to the pieces of data concatenated through the MHA modules.

According to an embodiment, the structure described above with reference to FIG. 8 may be effective in case that the input has a small variance, assuming the spatial domain as an axis. In addition, in an environment having mobility, the frequency selectivity may increase, and there may thus be an increased request to perform normalization between resource elements.

Referring to FIG. 9, the transformer block 900 according to various embodiments may include a RE-wise module 905, a first layer normalization module 910, an SD MHA module 915, a residual skip connection point which connects to the previous layer's data to directly use the same, a second layer normalization module 920, and an MLP module 925.

According to an embodiment, the RE-wise module 905 may apply the attention mechanism to E features that have been spatially embedded and input. The RE-wise module 905 may apply the attention mechanism to SF REs, thereby acquiring the cross-covariance regarding the RE domain, and may update the input according to the resulting covariance value's size. Through such a process, the transformer block 900 may extract correlation features between the time domain and frequency domain on the OFDM grid. That is, the transformer block 900 may calculate elements between highly correlated antennas, and may reflect and output the same.

According to an embodiment, after the embedded input passes through the RE-wise module, the first layer normalization 810 may perform layer normalization, and the result may be transferred to the SD MHA module 915.

According to an embodiment, the SD MHA module 915 may calculate the cross-covariance between E features. More specifically, SD MHA module 915 may update the information that has been input from the RE-wise module 905 and then normalized, by using the acquired covariance value.

According to an embodiment, data output from the RE-wise module 905 may be added to the data that has passed through the SD MHA module 915 as a residual connection. With regard to the result thereof, the second layer normalization module 920 may perform layer normalization. Thereafter, the fully connected layer-based MLP module 925 performs computation, and the same may be connected to the pieces of data concatenated through the MHA modules.

According to an embodiment, the structure described above with reference to FIG. 9 may be effective in case that the input has a small variance, assuming at least one of the time domain or the spatial domain as an axis. In addition, in case that the distance between antennas is large (for example, distributed MIMO), or in an environment having mobility, there may be an increased request to perform normalization between spatial elements.

Referring to FIG. 10, the transformer block 1000 according to various embodiments may include a two-dimensional (2D) batch normalization module 1005, a RE-wise module 1010, an SD MHA module 1015, a residual skip connection point which connects to the previous layer's data to directly use the same, a layer normalization module 1020, and an MLP module 1025.

According to an embodiment, the 2D batch normalization module 1005 may perform batch normalization with regard to features that have been embedded and input. In general, in order to update the model based on learning data, the gradient based on all pieces of data and the average regarding the same may be requested, and batch-unit learning may be performed in order to process a large amount of data in connection with model learning or training. During such a learning process, respective batch units may have various data distributions, and it is thus requested to perform batch-specific normalization. According to the above description, the 2D batch normalization module 1005 may compute the average and standard deviation with regard to each feature in connection with information that has been input, may perform normalization and scaling accordingly, and may output the result.

According to an embodiment, the RE-wise module 1010 may apply the attention mechanism to data that has undergone batch normalization. The RE-wise module 1010 may apply the attention mechanism to SF REs, based on the data that has undergone batch normalization, may thereby acquire the cross-covariance regarding the RE domain, and may update the input according to the resulting covariance value's size. Through such a process, the transformer block 1000 may extract correlation features between the time domain and frequency domain on the OFDM grid. That is, the transformer block 1000 may calculate elements between highly correlated antennas, and may reflect and output the same.

According to an embodiment, the SD MHA module 1015 may calculate the cross-covariance between E features. More specifically, the SD MHA module 1015 may update the information that has been input from the RE-wise module 1010, by using the covariance value.

According to an embodiment, data output from the 2D batch normalization module 1005 may be added to the data that has passed through the SD MHA module 1015 as a residual connection. With regard to the result thereof, the layer normalization module 1020 may perform layer normalization. Thereafter, the fully connected layer-based MLP module 1025 performs computation, and the same may be connected to the pieces of data concatenated through the MHA modules.

According to an embodiment, the structure described above with reference to FIG. 10 may be effective in case that the input has a small variance, assuming at least one of the spatial domain, the time domain, or the frequency domain as an axis. In addition, in the case of a UE that moves at a high speed, or in an environment in which the SNR is substantially low, there may be an increased request that the transformer block including the 2D batch normalization module perform computation.

According to various embodiments of the disclosure, FIG. 10 illustrates a structure in which the RE-wise module 1010 is configured to first process or compute the output that has undergone batch normalization, but this is only an example, and an embodiment may include a case in which the RE-wise module 1010 and the SD MHA module 1015 are disposed or operate in the opposite order. For example, the SD MHA module 1015 may apply the attention mechanism to data that has undergone batch normalization preferentially, and the RE-wise module 1010 may then apply the attention mechanism to SF REs, based on the data that has been attention-computed by the SD MHA module 1015, thereby acquiring the cross-covariance regarding the RE domain. Likewise, the order in which the layer normalization module and the MLP module are disposed and operate, after the residual connection, is only an example, and is not limitative. Respective modules may obviously be disposed in the opposite order, deleted, or modified.

Figure 11:
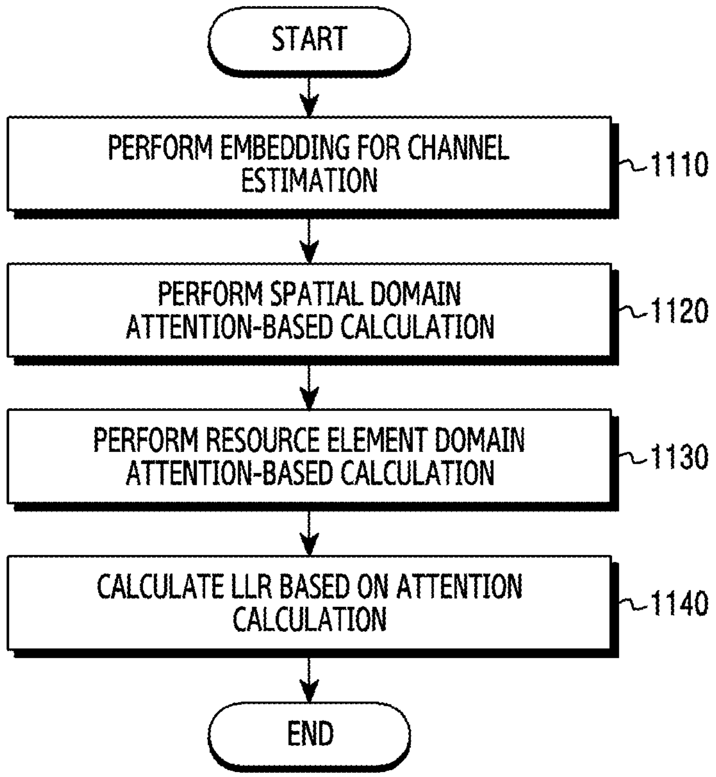
FIG. 11 illustrates a flowchart of operations for detecting signals, based on a transformer model, according to embodiments of the disclosure.

FIG. 11 illustrates a flowchart of operations for detecting signals, based on a transformer model, according to embodiments of the disclosure. More specifically, FIG. 11 illustrates a flow of operations based on the structures or methods described with reference to FIG. 7 to FIG. 10.

Hereinafter, according to various embodiments, a receiver including a transformer-based neural unit may be simply referred to as a receiver for convenience of description. The receiver is not limited to a receive implemented for a UE or a base station, and may include various kinds of receivers for detecting signals.

In step 1110, the receiver including a transformer unit may perform channel estimation regarding a received signal, and may perform embedding regarding the estimated channel. More specifically, the transformer unit may include a feature embedding block for embedding a channel's features, and at least one normalization block for performing the attention computation based thereon.

According to an embodiment, a stacked array $[Y, H, \Sigma, \tilde{X}] \in \mathbb{C}^{SF\times(N_t+1)(N_r+1)}$ may be given, with regard to five OFDM symbols and as many subcarriers as F. In order to use a real-valued neural network module, the input of $Z=[\Re\{Z\}, \Im\{Z\}] \in \mathbb{R}^{SF\times N_d}$ in case that $N_d=2(N_t+1)(N_r+1)$ may be generated, and the generated Z may be provided to the feature embedding layer 715. The receiver's embedding block may perform feature embedding so as to perform vectorization for mapping such that a pattern is identified from each feature of a signal, and similar features are extracted or classified. The feature embedding layer may project $N_d$ features into high-dimensional E features. Accordingly, the transformer unit may infer the correlation between intrinsic features more easily. Thereafter, the embedded feature vector $Z_e \in \mathbb{R}^{SF\times E}$ may be transferred to at least one transformer block.

In step 1120, the receiver including a transformer unit may perform spatial domain attention-based computation. More specifically, the receiver may perform the computation of SD MHA, based on embedded data, by the SD MHA module included in the transformer block.

According to an embodiment, the receiver's SD MHA module may apply the attention mechanism to E spatially embedded features. Specifically, the SD MHA module 725 may calculate the cross-covariance between E features, and may update the input according to the resulting covariance value's size. Therefore, through such a process, at least one transformer block may extract spatial domain signal features first, thereby detecting layer-specific symbols efficiently.

In step 1130, the receiver including a transformer unit may perform resource element domain attention-based computation. More specifically, the receiver may perform the computation of RE-wise MHA, based on embedded data, by the RE-wise MHA included in the transformer block.

According to an embodiment, the receiver's RE-wise module may apply the attention mechanism to SF REs, thereby acquiring the cross-covariance regarding the RE domain. Thereafter, the RE-wise module may update the value input from the SD MHA module by using the acquiring covariance value. Through such a process, at least one transformer block may extract correlation features between the time domain and frequency domain on the OFDM grid. That is, at least one transformer block may calculate elements between highly correlated antennas, and may reflect and output the same.

In step 1140, the receiver including a transformer unit may calculate the LLR, based on the above-described attention computations.

According to an embodiment, after an embedded input passes through two dual MHA modules, the layer normalization module may perform layer normalization, and the fully connected layer-based MLP module may perform computation. According to an embodiment, after passing at least one transformer block, the completely computed output value is $L \in \mathbb{C}^{F\times S\times N_t\times M}$, which may be the LLR value of M bits regarding $N_t$ layers. According to an embodiment, after passing at least one transformer block, $N_t \log_2 C$ output values may be mapped to $N_t \log_2 C$ bit probabilities that indicate the likelihood of zero bit according to a sigmoid activation function.

According to various embodiments of the disclosure, steps 1120 and 1130 may be performed in the opposite order. For example, the receiver may perform the computation of RE-wise MHA, based on embedded data, by the RE-wise MHA module included in the transformer block. Thereafter, the receiver may perform the computation of SD MHA by the SD MHA module included in the transformer block, based on the result.

According to an embodiment, although not illustrated in FIG. 11, the receiver may further perform normalization computation according to the 2D batch normalization module. This may correspond to the signal computing and processing operations according to the structure described in detail with reference to FIG. 10.

According to an embodiment, although not illustrated in FIG. 11, the receiver may further perform operations by modules for performing layer normalization and MLP modules. At least one of the procedure in which layer normalization is performed or the procedure in which MLP computation is performed may be further included in or after some steps in FIG. 11, and the same are obviously not indispensable components according to various embodiments and thus may be deleted or modified.

According to an embodiment, although not illustrated in FIG. 11, the receiver may further include a step of learning or training the transformer, based on the above-described steps. More specifically, the transformer model of the transformer unit may be trained based on the above-described procedures. In the learning step, the cross-entropy (CE) between a ground-truth bit vector b corresponding to an actual value and a predicted bit vector $\tilde{b}$ may be used as a loss function regarding each data sample.

Figure 12:
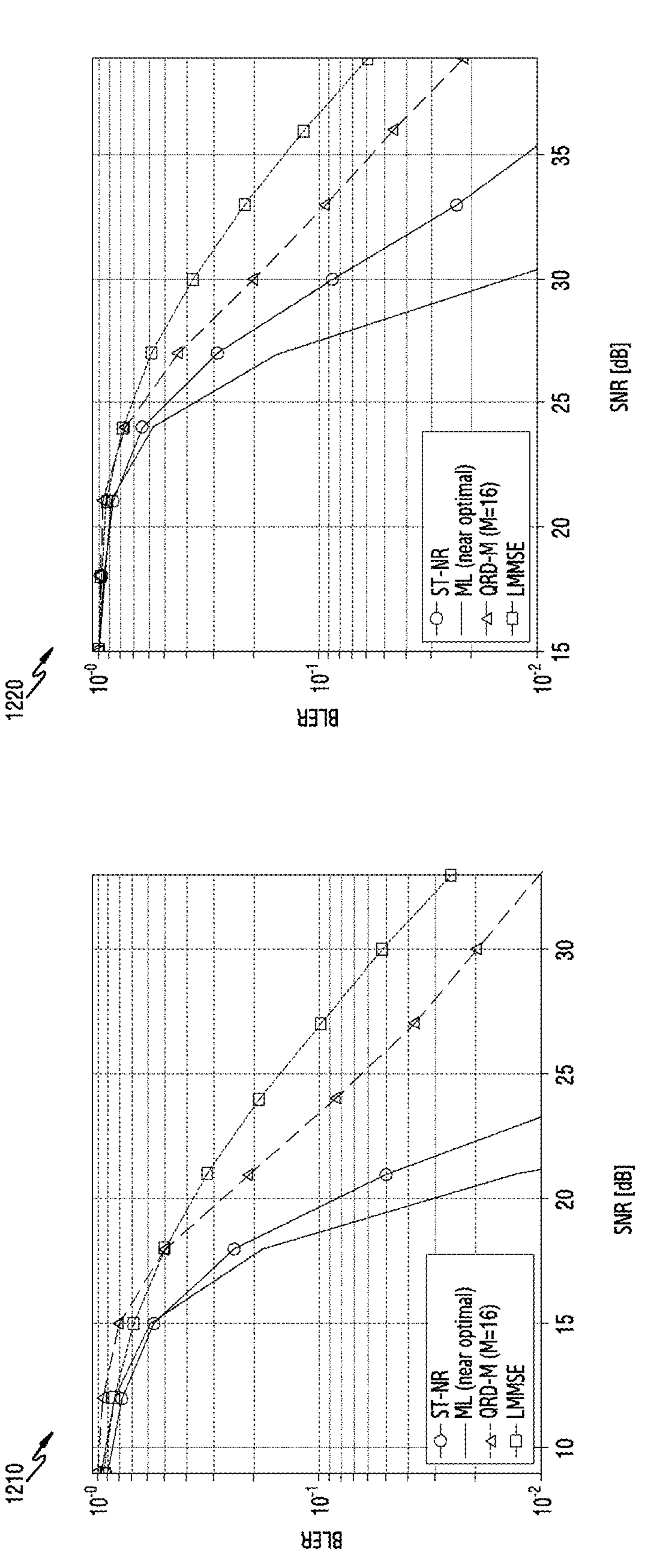
FIG. 12 illustrates the advantageous effect and performance of signal detection according to a transformer-based neural unit according to embodiments of the disclosure.

FIG. 12 illustrates the advantageous effect and performance of signal detection according to a transformer-based neural unit according to embodiments of the disclosure.

According to an embodiment, FIG. 12 illustrates signal detection performance in connection with a 4×4 MU-MIMO system (for example, $N_t$=$N_r$=4) with regard to S=14 symbols and F=12 subcarriers. In addition, it may be assumed that, for feature embedding, the value E of features is configured to be 512, and the number T of transformer blocks is configured to be 8. The used channel model may be a clustered delay line C (CDL-C) channel. In addition, maximum likelihood detection, QR decomposition M algorithm (QRDM) which is a tree search-based approximate maximum likelihood algorithm, and LMMSE detection may be illustrated as comparison targets.

FIG. 12 illustrates BLER performance according to various modulation coding schemes (MCSs). The first graph 1210 in FIG. 12 illustrates a case in which the MCS value is 11 (for example, 64 QAM, code rate=466/1024), and the second graph 1220 therein in which the MCS value is 20 (for example, 256 QAM, code rate=682.5/1024). FIG. 12 illustrates the average coding BLER performance between a transformer-based neural receiver according to embodiments of the disclosure and a receiver including a competitive detector, according to two different MCSs that use low-density-parity-check (LDPC) codes.

According to an embodiment, referring to first graph 1210 in FIG. 12, the transformer-based neural receiver may exhibit excellent performance compared with detection schemes with regard to all SNR domains. Particularly, the transformer-based neural receiver may accomplish the gain of 3.3 dB compared with the QRDM. This may result from the advantageous effect of the transformer-based receiver that detects signals by using all multi-domain signal features, unlike the QRDM which solely performs signal detection with regard to each resource element. In addition, the transformer-based neural receiver may exhibit a performance substantially close to the performance of the maximum likelihood detection scheme (for example, 1.3 dB gap).

According to an embodiment, referring to second graph 1220 in FIG. 12, the transformer-based neural receiver may exhibit a performance substantially superior to that of detection schemes even in higher-order modulation schemes, and may a performance close to that of the maximum likelihood detection scheme.

Consequently, various embodiments of the disclosure may include a transformer-based neural receiver for accomplishing an advantageous effect close to the maximum likelihood performance while reducing the degree of complexity. In particularly, various embodiments may commonly extract signal features in multiple domains, thereby accurately estimating soft bits, and may thus acquire a result close to the maximum likelihood performance, as illustrated in FIG. 12. According to an embodiment, a transformer-based neural receiver having the above-described structure may be applied to a RAN device (which includes, for example, a UE, a base station, and the like) having an NPU embedded therein.

Methods disclosed in the claims and/or methods according to the embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program includes instructions that cause the electronic device to perform the methods according to various embodiments of the disclosure as defined by the appended claims and/or disclosed herein.

These programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. In addition, a plurality of such memories may be included in the electronic device.

Furthermore, the programs may be stored in an attachable storage device which can access the electronic device through communication networks such as the Internet, Intranet, local area network (LAN), wide LAN (WLAN), and storage area network (SAN) or a combination thereof. Such a storage device may access the electronic device via an external port. Also, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments set forth herein, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A receiver in a wireless communication system, the receiver comprising:

a channel estimation circuit configured to estimate a channel; and a transformer-based neural circuit coupled to the channel estimation circuit, the transformer-based neural circuit for detecting an output signal comprising:

a feature embedder configured to embed the channel; and at least one transformer configured to calculate, based on the embedded channel, a log likelihood ratio (LLR), the at least one transformer comprising:

a first multi-head attention (MHA) circuit configured to perform an operation for a spatial domain; and a second MHA circuit configured to perform the operation for a resource element (RE).

2. The receiver of claim 1, wherein the first MHA circuit is further configured to perform, based on the embedded channel, spatial domain attention calculation for acquiring a cross-covariance value of the spatial domain, and wherein the second MHA circuit is further configured to perform, based on the embedded channel, resource element attention calculation for acquiring a cross-covariance value of a resource element domain.

3. The receiver of claim 1, wherein the first MHA circuit is further configured to perform, based on the embedded channel, spatial domain attention calculation, and wherein the second MHA is configured to perform resource element attention calculation based on a channel for which the spatial domain attention calculation has been performed.

4. The receiver of claim 1, wherein the second MHA circuit is further configured to perform, based on the embedded channel, resource element attention calculation, and wherein the first MHA circuit is configured to perform spatial domain attention calculation based on a channel for which the resource element attention calculation has been performed.

5. The receiver of claim 1, wherein the at least one transformer further comprises a two-dimensional (2D) batch normalization circuit.

6. The receiver of claim 1, wherein the at least one transformer further comprises a multi-layer perceptron (MLP) circuit for calculating the output signal based on results of calculation via the first MHA circuit and the second MHA circuit.

7. A base station in a wireless communication system, the base station comprising:

a channel estimation circuit configured to estimate a channel; and a receiver comprising a transformer-based neural circuit operably coupled to the channel estimation circuit, the transformer-based neural circuit for detecting an output signal comprising:

a feature embedder configured to embed the channel; and at least one transformer configured to calculate, based on the embedded channel, a log likelihood ratio (LLR), the at least one transformer comprising:

a first multi-head attention (MHA) circuit configured to perform an operation for a spatial domain; and a second MHA circuit configured to perform the operation for a resource element (RE).

8. The base station of claim 7, wherein the first MHA circuit is further configured to perform, based on the embedded channel, spatial domain attention calculation for acquiring a cross-covariance value of the spatial domain, and wherein the second MHA circuit is further configured to perform, based on the embedded channel, resource element attention calculation for acquiring a cross-covariance value of a resource element domain.

9. The base station of claim 7, wherein the first MHA circuit is further configured to perform, based on the embedded channel, spatial domain attention calculation, and wherein the second MHA circuit is configured to perform resource element attention calculation based on a channel for which the spatial domain attention calculation has been performed.

10. The base station of claim 7, wherein the second MHA circuit is further configured to perform, based on the embedded channel, resource element attention calculation, and wherein the first MHA circuit is further configured to perform spatial domain attention calculation based on a channel for which the resource element attention calculation has been performed.

11. The base station of claim 7, wherein the at least one transformer further comprises a two-dimensional (2D) batch normalization circuit.

12. The base station of claim 7, wherein the at least one transformer further comprises a multi-layer perceptron (MLP) circuit for calculating the output signal based on results of calculation via the first MHA circuit and the second MHA circuit.

13. A user equipment in a wireless communication system, the user equipment comprising:

a channel estimation circuit configured to estimate a channel; and a receiver comprising a transformer-based neural circuit coupled to the channel estimation circuit, the transformer-based neural circuit for detecting an output signal comprising:

a feature embedder configured to embed the channel; and at least one transformer configured to calculate, based on the embedded channel, a log likelihood ratio (LLR), the at least one transformer comprising:

a first multi-head attention (MHA) circuit configured to perform an operation for a spatial domain; and a second MHA circuit configured to perform the operation for a resource element (RE).

14. The user equipment of claim 13, wherein the first MHA circuit is further configured to perform, based on the embedded channel, spatial domain attention calculation for acquiring a cross-covariance value of the spatial domain, and wherein the second MHA circuit is further configured to perform, based on the embedded channel, resource element attention calculation for acquiring a cross-covariance value of a resource element domain.

15. The user equipment of claim 13, wherein the first MHA circuit is further configured to perform, based on the embedded channel, spatial domain attention calculation, and wherein the second MHA circuit is configured to perform resource element attention calculation based on a channel for which the spatial domain attention calculation has been performed.

16. The user equipment of claim 13, wherein the second MHA circuit is further configured to perform, based on the embedded channel, resource element attention calculation, and wherein the first MHA circuit is further configured to perform spatial domain attention calculation based on a channel for which the resource element attention calculation has been performed.

17. The user equipment of claim 13, wherein the at least one transformer further comprises a two-dimensional (2D) batch normalization circuit.

18. The user equipment of claim 13, wherein the at least one transformer further comprises a multi-layer perceptron (MLP) circuit for calculating the output signal based on results of calculation via the first MHA circuit and the second MHA circuit.

19. A method performed by a receiver in a wireless communication system, the method comprising:

estimating a channel;

embedding the channel;

performing, based on the embedded channel, spatial domain attention calculation for acquiring a cross-covariance value of a spatial domain;

performing, based on the embedded channel, resource element attention calculation for acquiring a cross-covariance value of a resource element domain; and calculating a log likelihood ratio (LLR) based on results of the spatial domain attention calculation and the resource element attention calculation.

20. The method of claim 19, wherein the resource element attention calculation is performed based on a channel for which the spatial domain attention calculation has been performed, or the spatial domain attention calculation is performed based on a channel for which the resource element attention calculation has been performed.

* * * * *